Oct. 19, 1926.

J. N. HARPER 1,603,847

READY REFERENCE INDICATOR

Filed May 4, 1926

Inventor

Joseph N. Harper

By Emery, Booth, Janney & Varney his Attorneys

Patented Oct. 19, 1926.

1,603,847

UNITED STATES PATENT OFFICE.

JOSEPH N. HARPER, OF ATLANTA, GEORGIA, ASSIGNOR TO W. R. GRACE & CO., A CORPORATION OF CONNECTICUT.

READY-REFERENCE INDICATOR.

Application filed May 4, 1926. Serial No. 106,722.

This invention aims to provide an improved indicator, or reference chart, for use in determining quantities of special components to be used under given conditions for the accomplishment of desired results, the quantities being instantly readable without any calculations. The purpose more particularly is to provide a device of this character applicable to the determination of the quantity and kind of fertilizer recommended for the growth of certain crops in various soils.

Other objects and advantages of my invention will appear from the following description of the illustrative embodiment shown in the accompanying drawings, wherein.

Figures 1, 2, 3:
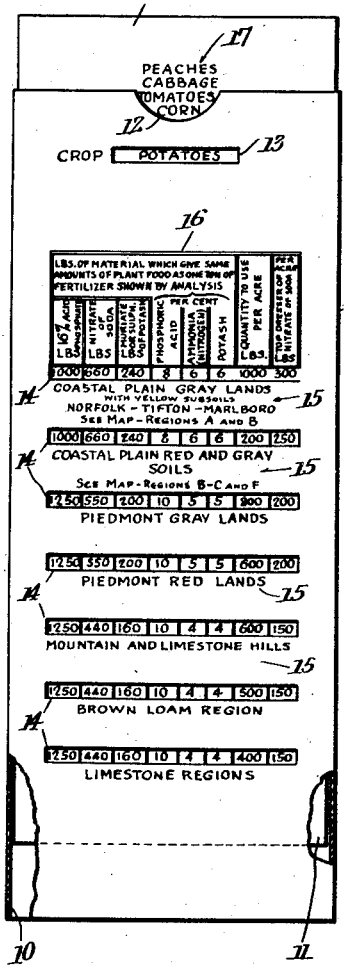
Fig. 1 is a front view, partly broken away, of the complete indicator, set for a particular crop.
Fig. 2 is a front view of the slide.
Fig. 3 is a back view of the cover and exposed portion of the slide, the latter being further withdrawn than in Fig. 1 so as to show more of the information printed thereon.

Referring to the drawing (Fig. 1), the embodiment of the invention shown comprises a rectangular casing 10, wherein a rectangular sliding data sheet 11 is fitted to move easily but with sufficient friction to hold it in place when set. The casing shown is an open-ended envelope notched at 12 to allow ready grasping of the slide 11. This envelope has, on its face, several windows 13 and 14, here shown as narrow transverse slots, to expose to view appropriate data on the sliding sheet 11.

One window opening 13, herein the one at the top, is arranged to serve as the "crop" window, and is so identified on the envelope; while other windows are identified by titles 15 which have to do with geographical regions and types of soil. All the windows 14 are shown as of the same length and aligned in a vertical column, although they may be of such dimensions respectively as to suit the data each is intended to exhibit.

A group of suitable column headings 16 is printed above the series of soil-type windows 14, or in any other convenient place. Each heading of the group serves to classify data which will be exposed at one or more windows of the series. These headings name various fertilizer components and include suitable explanatory wording. Each of them is placed to cooperate with correspondingly arranged columns of figures on the sliding data sheet 11. As here shown there are eight headings which refer to the number of pounds of ready-mixed fertilizer and of top dresser to be used to the acre; to the percentages of various plant foods contained therein; and to quantities of other fertilizing constituents required to supply the same amounts of given plant foods as a ton of the ready-mixed fertilizer for which the tables 19, Fig. 2, are calculated.

The back of the casing, (Fig. 3) bears a geographical index 18 for ascertaining the sort of soil existing in the different regions of the territory wherein it is intended to use the chart, this index showing which of the windows on the front of the casing will display the desired data. I have here illustrated this geographical index as an outline map divided into soil-type regions indicated by letters A, B, and so on, the regions being bounded by light dotted lines, readily distinguished from the geographical boundaries; but it will be readily understood that this index may be arranged in tabular form, or in any other convenient manner. These soil region designating letters are included with other matter in the soil window titles 15 (Fig. 1).

As best seen in Fig. 2, the sliding data sheet 11 bears on its face two sets of data; one a list of crops 17, co-operating with the crop window 13, the other set 19, a plurality of columns of numerical values cooperating with some or all of the windows 14. The set of numerical data 19 is arranged in columns so placed as to fit the headings 16 on the front casing. The successive figures of each column are aligned in sequence so that a horizontal reading across the several columns exposed at each of the soil-windows, will give fertilizer quantities and values for the crop desired for the character of soil prevailing in the region to which that window refers, as shown by the title 15 and by the geographical index 18, such quantities and values falling under the appropriate headings 16 as shown in Fig. 1.

These two sets of data 17 and 19 are arranged in such spaced relation to one another and to the windows 13 and 14 that when one item of the first set 17 is shown through the crop window 13 all the data in set 19 pertinent to that crop and none other will be exposed at the various windows 14.

Gaps 20 are left in the columns 19, so placed that in case a particular crop cannot advantageously be raised in some of the soils indicated by the titles 15 no fertilizer values will appear at those windows 14 which relate to such soils.

On the back of the slide 11, shown in Fig. 3 as partially drawn out from the casing, I may print more detailed information as to soil characteristics, amplifying the geographical index 18. For example, in Fig. 3 I have shown on the back of the casing a geographical chart 18 comprising an outline map of several States, with soil regions broadly sketched thereon, but the back of the slide carries further notes as to smaller districts, seasonal requirements, and the like, which cannot readily be included in the geographical index. These additional notes, two of which I have indicated at 21 and 22, may be referred to in the titles applied to the various soil windows 14, thus serving to amplify the usefulness of the geographical index.

The manner of use of the invention will be apparent from the following illustration. The user, whom we will assume resides in northeastern North Carolina and intends to plant potatoes, sets the slide 11 so that the word "Potatoes" appears at the crop window 13. Consulting the geographical chart he finds that his locality is in region A. Reading the figures which show through the window marked "Region A", and referring to the various column headings 16, he is enabled instantly to ascertain that for each acre of potatoes he intends to plant he should use 1,000 pounds of ready-mixed fertilizer with 300 pounds of top dresser, per acre; that the formula required is 8—6—6, or 8% phosphoric acid, 6% nitrogen, and 6% potash; and that for the same amounts of these constituents as are contained in a ton of ready-mixed fertilizer, he would need 1,000 pounds of 16% acid phosphate, 660 pounds of nitrate of soda, and 240 pounds of muriate or sulphate of potash. Turning now to the back of the indicator, Fig. 3, he pulls out the slide 11 far enough to read the detailed notes pertaining to Norfolk soil, which we will assume prevails in his section, and thus learns what particular points are to be observed in the application of the fertilizer in his section.

Obviously my invention is adapted to displaying data concerning many agricultural and industrial operations, and is not limited to the particular embodiment and manner of use herein shown and described.

What I claim is:

1. A reference indicator comprising, in combination, a casing having a series of transverse window openings therein, a single data sheet slidable in the casing and having two sets of data on the face thereof corresponding to said window openings, one set comprising items of known data arranged in a single column, said items adapted to be exposed selectively at one of said window openings, the other set consisting of items of data to be determined, arranged in columns lengthwise of said slidable data sheet and in horizontal alignment so that one item from each of a plurality of said columns will simultaneously be exposed to view in the appropriate ones of the remaining window openings, said remaining window openings being respectively identified, and a single series of headings placed on said casing in registry with said lengthwise columns on said slidable data sheet.

2. A crop fertilizer indicator comprising, in combination, an elongated flat casing, and an elongated sliding sheet so fitted therein as to be limited to rectilinear movement, correlated sets of data arranged in columns on the same side of said sliding sheet, one set including printed names of crops, the other set including a plurality of parallel columns of numbers representing quantities of fertilizer components, said casing being provided on one side with a plurality of narrow transverse windows adapted to expose certain correlated items of each of said sets of data when said sliding sheet is in predetermined positions, one of said windows being designated to expose the name of a crop and each of the other windows being identified by soil characteristics, and a plurality of column headings printed adjacent one of said soil characteristic windows in such spaced relation as to register with and identify such items printed in said parallel columns on said sliding sheet as may be exposed at said soil characteristic windows, whereby there will be exposed at said soil characteristic windows data corresponding to the crop of the name exposed at said crop name window, said data being arranged to register with said column headings for identification thereby.

3. In a crop fertilizer indicator as set forth in claim 2, soil characteristic windows of equal dimensions, arranged in a vertical column at equal distances.

In testimony whereof, I have signed my name to this specification.

J. N. HARPER.